Figure 1:
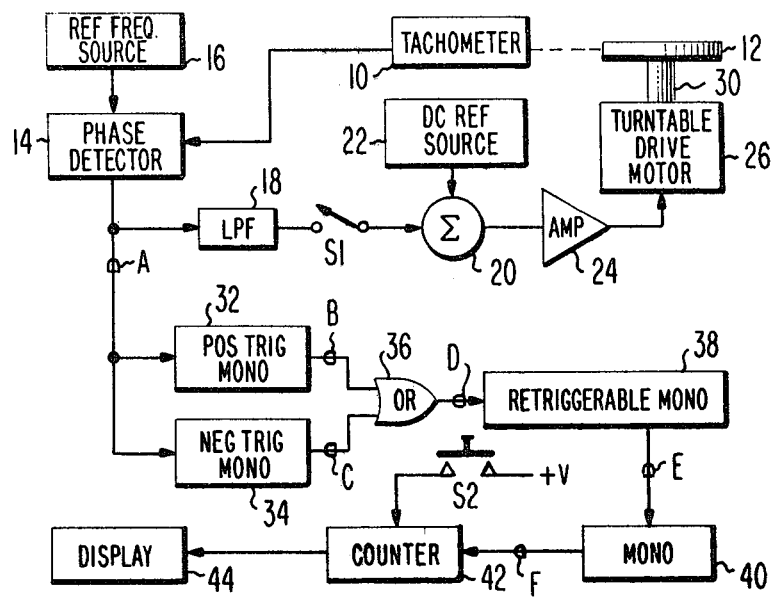

United States Patent [19]

Castle

[11] 4,316,143
[45] Feb. 16, 1982

[54] SPEED DEVIATION DETECTOR FOR SERVO CONTROLLED DISC MASTERING TURNTABLE

[75] Inventor: Richard M. Castle, Indianapolis, Ind.

[73] Assignee: RCA Corporation, New York, N.Y.

[21] Appl. No.: 154,599

[22] Filed: May 29, 1980

[51] Int. Cl.³ .............................................. G01P 3/46
[52] U.S. Cl. .................................... 324/161; 318/608; 318/628; 318/638; 358/128.6
[58] Field of Search ...................... 324/161, 163, 166; 250/231 SE; 318/599, 608, 606, 628, 638; 358/8, 128.6; 346/137; 352/102; 361/242

[56] References Cited

U.S. PATENT DOCUMENTS

| | | | |
|---|---|---|---|
| 3,381,085 | 4/1966 | Johnson et al. | 178/6.7 |
| 3,423,524 | 1/1969 | Bradford | 178/6.7 |
| 3,965,482 | 6/1976 | Burrus | 358/128.6 |
| 3,967,311 | 6/1976 | Fuhrer | 358/128.6 X |
| 4,021,681 | 5/1977 | Miesterfeld | 324/161 X |
| 4,031,466 | 6/1977 | Krause et al. | 324/166 X |

*Primary Examiner*—Stanley T. Krawczewicz
*Attorney, Agent, or Firm*—E. M. Whitacre; J. S. Tripoli; R. G. Coalter

[57] ABSTRACT

Variations of the speed of a video disc mastering turntable which lie within the lock range of a phase-lock-loop turntable speed control servo are detected by sensing variations of the loop phase detector waveform symmetry. Speed error limits are established by pulse forming circuitry which continuously restarts a timing circuit in one mode of operation and allows the timing circuit to complete a timing cycle in another mode of operation. A further timing circuit is arranged to reject multiple indications of the same speed error whereby a single output indication is provided for all speed errors occurring in a certain time period.

5 Claims, 3 Drawing Figures

SPEED DEVIATION DETECTOR FOR SERVO CONTROLLED DISC MASTERING TURNTABLE

This invention relates generally to mastering of records and particularly to detectors for detecting variations of the turntable speed of a video disc mastering lathe.

A problem particularly troublesome in the mastering of video disc records is that very small deviations of the speed of the mastering turntable can result in gross changes of the spectrum of the recorded information. As an illustration of the severity of this problem, consider the case where a one percent speed error occurs during real time mastering of a video disc in which an audio signal is being recorded on an FM carrier having a center frequency of 1 MHz and peak deviation of 50 KHz. Under such circumstances the one percent speed error corresponds to a deviation of the recorded FM carrier of 10 KHz or 20% of the carrier deviation range.

The precision turntable speed control needed for video disc mastering may be obtained by means of a phase lock loop (PLL) servo control. Even with such control, however, transient speed errors may nevertheless occur as a result of a brief power interruption, a line voltage transient or some other unpredictable condition. If a speed error beyond acceptable limits should occur while a disc substrate is being cut it would be desirable to detect the error immediately rather than to discover its effect later upon playback of the finished disc. By immediate detection of speed errors the cutting operation may be aborted thereby avoiding wasting the time required to finish cutting the substrate. The amount of time saved may be substantial as, for example, in the case where a speed error occurs in the first minute of a disc requiring one hour of cutting time. If the recording is being done at less than real time, for example, one-half real time, each side of the substrate of a one hour per side substrate takes two hours to cut. Thus, the time savings are even greater in a less than real time mastering operation.

Gross speed errors of a PLL servo controlled turntable could, conceivably, be detected by testing the phase relationship of the loop feedback and reference signals to determine if the turntable speed is beyond the loop lock range. The difficulty with such an approach is that where the loop lock range exceeds the allowable speed tolerance range, speed variations within the loop lock range but greater than the speed tolerance range cannot be detected. A solution to this problem, which upon first consideration appears feasible, would be to narrow the loop lock range so as to be equal to or less than the speed tolerance range and detect the error by means of a conventional loss-of-lock detector. The difficulty there, however, is that reduction of the loop lock range will also reduce the loop capture range. This will tend to make initial phase lock acquisition more difficult and may also present problems in terms of loop stability.

The present invention resides in part in recognition of the need for a speed deviation detector for a video disc mastering turntable for providing an output indication of turntable speed errors beyond predetermined limits. Another aspect of the invention resides in recognition of the desirability of controlling the turntable speed by means of a phase lock loop servo having a lock range greater than the allowable speed error range of the turntable.

In accordance with a first aspect of the invention a reference signal and a turntable speed indicating signal are supplied to the phase detector means of a phase lock loop servo controlled video disc mastering turntable for producing a turntable speed regulating control signal which exhibits symmetry variations characteristic of turntable speed errors. Symmetry deviation detection means responsive to the control signal provides a first output signal manifestation when the symmetry variations are within predetermined limits and a second output signal manifestation when the symmetry variations exceed the predetermined limits. The predetermined limits are selected to lie within the lock range of the phase lock loop servo.

In accordance with another aspect of the invention the symmetry deviation detector includes pulse forming means responsive to a transition of either sense of the control signal for producing a trigger pulse, each trigger pulse having a width substantially less than one half the period of the control signal. Retriggerable multivibrator means having a quasi-stable state lying within a range between one half and one full period of the control signal produces the output signal manifestations in response to the trigger pulses.

In accordance with a further aspect of the invention circuit means are provided for producing a single output error signal manifestation in response to a number N of the second output signal manifestations occurring within a time T, N being at least one, T being greater than one full period of the control signal.

Figure 2:
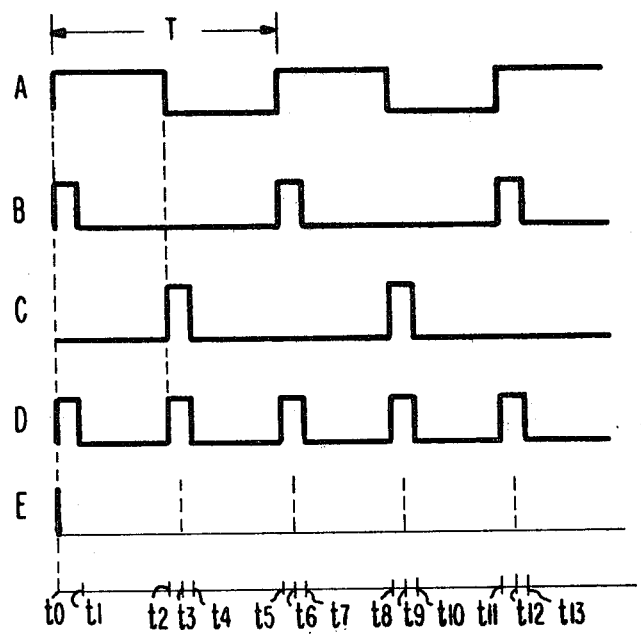
Figure 3:
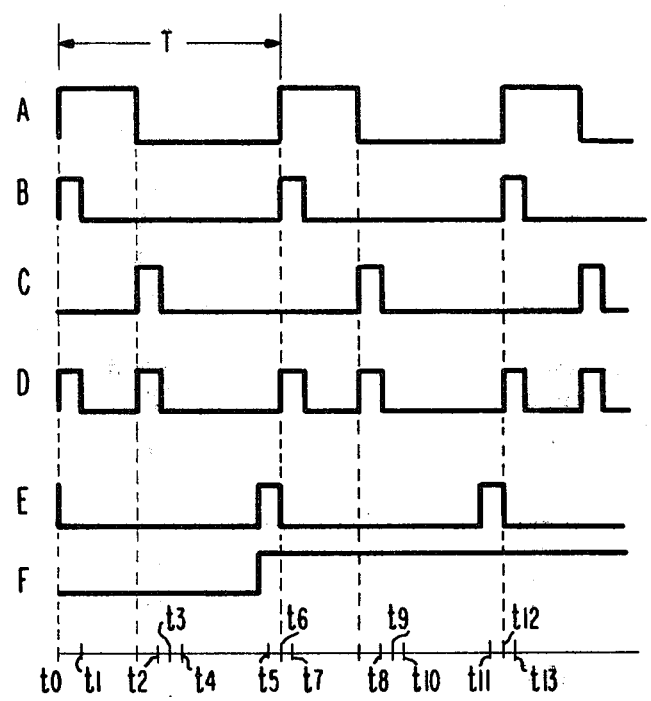

The foregoing and additional features of the invention are described in detail hereinafter and shown in the accompanying drawings wherein:

FIG. 1 is a block diagram of a video disc mastering system embodying the invention; and FIGS. 2 and 3 are waveform diagrams illustrating certain aspects of operation of the mastering system of FIG. 1.

In FIG. 1 tachometer 10 is coupled to turntable 12 for producing output pulses representative of the turntable rotational speed. Preferably, tachometer 10 is of the optical type so that the coupling to turntable 12 does not introduce a drag effect which might influence the turntable speed. Alternatives, such as magnetically or mechanically coupled tachometers, are less satisfactory in this regard but may be used if the drag effect is sufficiently small so as to be negligible with respect to the degree of speed tolerance desired. Illustratively, tachometer 10 may comprise a light source arranged to reflect light from an optical fence or grating mounted or formed on the rim of turntable 10 and a photo detector arranged to receive the reflections of the light. Alternatively, the grating (or fence) may be arranged to interrupt the light beam rather than reflect it.

The turntable speed pulses produced by tachometer 10 are applied to one input of a phase detector 14 which receives a speed reference signal produced by a reference frequency source 16 at its other input. To obtain maximum stability and accuracy of the servo system and maximum sensitivity of the speed error detector circuitry it is preferable that source 16 comprise a crystal controlled oscillator or some other device having good accuracy and stability. The frequency of source 16 depends upon the resolution of tachometer 10 and the desired speed of rotation of turntable 12. If, for example, the desired rotational speed is 10 revolutions per second and tachometer 10 has a resolution of 1000 (i.e., it produces 1000 pulses per turntable revolution) then source 16 should be selected to supply a signal to phase detector 14 of 10 KHz.

If desired, one may include a divider in the path between tachometer 10 and phase detector 14 for providing multi-speed mastering. Suppose, for example, that speeds of 5 and 10 revolutions per second are desired and that the tachometer resolution is 1000. In that case, source 16 would be set to 5 KHz and the output of tachometer 10 would be divided by 2 to obtain 10 RPS operation and not divided to obtain 5 RPS operation. Alternatively, rather than dividing the output of tachometer 10 to obtain multispeed operation one could instead alter the frequency of source 16.

Phase detector 14 compares the phase of the signals produced by source 16 and tachometer 10 and produces an output control signal having a rectangular waveform. When the servo system is in a phase locked condition the control signal will have a frequency equal to that of the source 16 and tachometer 10 input signals and a symmetry or duty cycle proportional to the phase difference between the input signals. The actual phase value of the phase difference depends upon the class of phase detector used and the phase shift within the closed loop servo system. For example, for a phase detector of the exclusive-OR type which exhibits a non-ambiguous lock range of 180 electrical degrees, the phase difference for a zero speed error at lock will be 90 or 270 electrical degrees. For a phase detector of the edge triggered type which exhibits a non-ambiguous lock range of 360 electrical degrees, the phase difference for zero speed error will be 0 or 180 electrical degrees. The edge triggered type detector is preferred because of its superior lock range and when operated in the 180 degree mode produces a square wave output signal having a symmetry proportional to the speed error. A commercially available device containing both types of phase detectors is the type CA 4046 integrated circuit.

The output of phase detector 14 is smoothed by means of lowpass filter (LPF) 18 and applied to a summing circuit 20 by means of switch S1 where it is added to a d.c. reference voltage provided by d.c. reference source 22. The output of summing circuit 20 is then amplified by means of power amplifier 24 which supplies power to turntable drive motor 26 that is coupled to turntable 12 by means of drive shaft 30.

The purpose of switch S1 is to open the servo feedback path during start up of drive motor 26 to prevent excessive "hunting" which otherwise might occur and to allow accurate initial open loop turntable speed adjustment. The procedure for starting the system is to open switch S1 and adjust d.c. reference source 22 until the frequency of the signal produced by tachometer 10 is substantially equal to that of reference frequency source 16. With this adjustment made the turntable speed will lie within the lock range of phase detector 14 so that when switch S1 is closed phase lock will be acquired. The polarity of the voltage produced at the output of lowpass filter 18 relative to that produced by source 22 is selected to be such that the sum thereof varies inversely with the speed error so as to counteract any tendency of the speed of turntable 12 to vary.

When phase lock is acquired as described above, and the speed error is zero the output of phase detector 14 will be a symmetrical square wave, i.e., it will exhibit a fifty percent duty cycle and any speed error will result in a change in the waveform symmetry. As previously explained, it is advantageous that the servo speed lock range be sufficiently wide (say a percent or so of the desired speed) so as to simplify lock acquisition and provide good stability yet it is necessary for the reasons earlier stated to be able to detect unacceptable speed errors within this lock range. The remaining elements of FIG. 1 comprise a symmetry deviation detector which meets this need by providing a first output signal manifestation when the phase detector symmetry variations are within predetermined limits and a second output signal manifestation when the symmetry variations exceed the predetermined limits.

In more detail, the output of phase detector 14 is applied to the inputs of a pair of positive and negative edge triggered monostable multivibrators 32 and 34, respectively, the outputs of which are logically summed by means of an OR gate 36. The combination of elements 32, 34 and 36 comprises a pulse forming means which is responsive to a transition in either sense of the control signal produced by phase detector 14 for producing a trigger pulse. The monostable time constants are selected such that each trigger pulse has a width substantially less than one half of the period of the control signal. A suitable multivibrator which may be configured for positive or negative edge triggering and for monostable operation is the type CD 4047 integrated circuit.

The output of OR gate 36 (which, illustratively, may be a type CD 4071 integrated circuit) is applied to the retrigger input of a retriggerable monostable multivibrator 38 which also may be a CD 4047 integrated circuit adapted for operation in the positive edge retrigger mode. Multivibrator 38 is selected to exhibit a predetermined quasi-stable state lying within a range between one half and one full period of the control signal produced by phase detector 14.

The output of multivibrator 38 is applied to a cascade connection of a monostable multivibrator 40, a resettable counter 42 having a reset switch S2 and a display device 44 connected thereto as shown. The function of a multivibrator 40 is to provide a single output error signal manifestation in response to a number N of the output pulses produced by multivibrator 38 occuring within a period of time T, N being at least one, T being greater than one full period of the output signal of phase detector 14. By this means a momentary speed error which would cause multivibrator 38 to produce a large number of pulses will be counted as a single error by counter 42 and so displayed in display device 44. Suitable devices for implementing elements 40, 42 and 44 are, respectively, type CD 4047, CD 4026 and TIL 313 integrated circuits.

FIG. 2 provides further illustration of the operation the detector of FIG. 1 for the case where the speed error lies within predetermined limits which, as will be explained, are determined by the width of the pulses produced by multivibrators 32 and 34. The letter designation of the waveforms A-E correspond to the signals at like identified points in FIG. 1. For ease of illustration, the width of the pulses produced by multivibrators 32 and 34 are greatly exaggerated. In practice, the pulses may be made much narrower to increase the sensitivity of the detector.

Waveform A, the phase detector output, is assumed in this example to be perfectly symmetrical having equally spaced transitions at times $t_0$, $t_2$, $t_5$, $t_8$, and $t_{11}$. This symmetrical condition corresponds, as previously explained, to a zero speed error condition for the servo system (elements 10-30 of FIG. 1). Each positive transition of waveform A ($t_0$, $t_5$, $t_{11}$) causes multivibrator 32 to produce an output pulse having a width ($t_0$-$t_1$, $t_5$-$t_7$, $t_{11}$-$t_{13}$) substantially less than one half T where T, as indicated, is the period of the control signal (waveform A) produced by phase detector 14. Each negative transition of waveform A ($t_2$, $t_8$) similarly causes multivibrator 34 to produce an output pulse (waveform C) which preferably is of the same width as the pulses produced by multivibrator 32. This condition of equality of pulse widths equalizes the detector sensitivity for speed changes of either sense.

Waveform D illustrates the logical sum of waveforms B and C which is produced by OR gate 36. Each pulse of the D waveform begins at a transition of waveform A so that pulses are produced having widths $t_0$-$t_1$, $t_2$-$t_4$, $t_5$-$t_7$, etc.

Waveform E illustrates by dashed vertical lines the quasi-stable period of retriggerable monostable multivibrator 38. The quasi-stable period is set to lie within the range between T and T/2 and, in this example, bisects the pulses of waveform D at time $t_3$, $t_6$, $t_9$, and $t_{12}$. As long as the pulses of waveform D overlap the quasi-stable period of waveform E multivibrator 38 is continuously retriggered and its output E will remain at a constant level. If any one of the waveform D pulses arrives either too early or too late, multivibrator 38 will not be continuously retriggered and will assume its stable state, thereby providing an output indication that a speed error has occurred. This will trigger multivibrator 40 which, in turn, will increment counter 42 and provide a visual indication on display 44. The time constant of multivibrator 40 is preferably very long (e.g., one or several seconds) so that each speed error (which may allow multivibrator 38 to be triggered several times) is counted only once. Where quality control standards are such that one or two speed errors in mastering are acceptable, but a larger number is not, the mastering lathe operator may use the indication of display 44 as a basis for aborting a mastering operation. If desired, this could be done automatically by decoding the output of counter 42 and applying the decoded signal to a suitable point in the mastering servo control system to cause automatic shutdown.

FIG. 3 illustrates the case where a speed error has occurred such that waveform A is no longer symmetrical and multivibrator 38 is not continuously retriggered. In this particular example, the negative transition of waveform A occurs much earlier than times $t_3$ and $t_9$. As a result the pulses of waveform C occur prior to times $t_2$ and $t_8$ so that there is sufficient time for multivibrator 38 to complete its quasi-stable cycle and return to its stable state. This occurs at times just prior to $t_5$ and $t_{11}$ where multivibrator 38 would normally be retriggered and start a new quasi-stable state timing cycle. As a result, multivibrator 40 is triggered (waveform F) and since its quasi-stable state is much longer than T the second pulse produced by multivibrator 38 has no effect and a single pulse is provided to counter 42.

Similar results are obtained if it is assumed that waveform A is of opposite symmetry, i.e., that the pulses of waveform C are delayed rather than advanced relative to the position shown in FIG. 2. Thus, regardless of whether the speed change is in a sense to increase or decrease the average value of waveform A all speed errors sufficient to displace alternate pulses of waveform D sufficiently to allow multivibrator 38 to complete its quasi-stable state cycle will be detected and a single output indication will be provided for each disturbance less than the period of multivibrator 40.

What is claimed is:

1. A detector for detecting speed errors of a PLL servo controlled turntable, said PLL servo having a given phase lock range, said detector comprising:
    phase detector means in said PLL servo responsive to a reference signal and a turntable speed indicating signal supplied thereto for producing a control signal for regulating the speed of said turntable, said control signal exhibiting symmetry variations characteristic of said speed errors; and
    symmetry deviation detection means responsive to said control signal for providing a first output signal manifestation when said symmetry variations are within predetermined limits and a second output signal manifestation when said symmetry variations exceed said predetermined limits, said predetermined limits lying within said given phase lock range of said PLL servo.

2. A detector as recited in claim 1 wherein said symmetry deviation detection means comprises:
    pulse forming means responsive to a transition in either sense of said control signal for producing a trigger pulse, each trigger pulse having a width substantially less than one half period of said control signal; and
    retriggerable multivibrator means responsive to the trigger pulses produced by said pulse forming means for producing said output signal manifestations, said retriggerable multivibrator means having a predetermined quasi-stable state lying within a range between one half and one full period of said control signal.

3. A detector as recited in claim 2 further comprising:
    circuit means for producing a single output error signal manifestation in response to a number N of said second output signal manifestations produced by said multivibrator means occurring within a time t, N being at least one, t being greater than said one full period of said control signal.

4. A detector as recited in claim 3 further comprising:
    counter means for counting the output error signal manifestations produced by said circuit means.

5. A detector as recited in claim 4 further comprising:
    display means responsive to the count in said counter means for providing a visual indication of at least one value of the count.

* * * * *